United States Patent
Yuri

[19]

[11] Patent Number: 5,887,959
[45] Date of Patent: *Mar. 30, 1999

[54] DISPLAY HOLDING DEVICE OF PROJECTION TELEVISION

[75] Inventor: Toru Yuri, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 779,662

[22] Filed: Jan. 7, 1997

[30] Foreign Application Priority Data

Aug. 2, 1996 [JP] Japan ..................................... 8-204971

[51] Int. Cl.⁶ ..................................................... H04N 5/64
[52] U.S. Cl. ............................................. 312/7.2; 348/836
[58] Field of Search ........................ 361/682; 312/223.2, 312/223.1, 7.2, 114, 265.5; 40/776, 771; 248/473, 917, 444.1; 348/836, 839, 840, 842, 843, 841; 52/786.1, 786.11, 786.13, 788.1, 800.1, 800.16, 800.17, 800.18, 800.14, 800.15

[56] References Cited

U.S. PATENT DOCUMENTS

| | | | |
|---|---|---|---|
| 998,620 | 7/1911 | Leonard | 52/800.14 X |
| 2,659,463 | 11/1953 | Persson | 52/800.15 X |
| 2,779,938 | 1/1957 | Pifer | 312/7.2 X |
| 2,857,588 | 10/1958 | Korol | 348/836 |
| 3,557,324 | 1/1971 | Nakamatsu | 348/836 X |
| 3,787,922 | 1/1974 | Foy et al. | 248/473 X |
| 4,004,389 | 1/1977 | DiFazio | 52/786.13 X |
| 4,710,591 | 12/1987 | Rochester, Jr. | 348/836 X |
| 5,119,271 | 6/1992 | Aoki et al. | 361/682 |
| 5,131,194 | 7/1992 | Anderson | 52/786.1 X |
| 5,351,176 | 9/1994 | Smith et al. | 248/917 X |

FOREIGN PATENT DOCUMENTS

| 4-70645 | 6/1992 | Japan . |
|---|---|---|
| 5-40315 | 2/1993 | Japan . |

*Primary Examiner*—Peter M. Cuomo
*Assistant Examiner*—Janet M. Wilkens

[57] ABSTRACT

A display holding device of projection television is secured on a cabinet of the projection television and has a rigid material section secured on the cabinet, and an elastic material section for sandwiching the display section, which is integrally formed on the rigid material section. The display section has a screen on which an image is projected and a filter which is provided outside the screen to face the screen at a certain distance. The elastic material section has first to fourth protuberances. The screen is sandwiched between the first and second protuberances on the elastic material section. The filter is sandwiched between the third and fourth protuberances on the elastic material section.

13 Claims, 10 Drawing Sheets

DISPLAY HOLDING DEVICE OF PROJECTION TELEVISION

BACKGROUND OF THE INVENTION

The present invention relates to a display holding device of a projection television, which secures a screen and a filter on a cabinet of a rear-projection-type projection television (hereinafter referred to as PTV).

FIG. 19 is a sectional view schematically showing a conventional PTV display holding device. As shown in FIG. 19, the display holding device has a screen frame 22 secured on a cabinet 1, a screen mount 23 fastened on the screen frame 22 by screws 4, and a filter mount 25 fit on the screen frame 22. Protection tape 26–29 is utilized to prevent a screen 6 and a filter 7 from being damaged due to impact, vibration, and other causes. The screen 6 is tightly sandwiched between the protection tape 26 on the screen mount 23 and the protection tape 27 on the screen frame 22, and the filter 7 is tightly sandwiched between the protection tape 28 on the screen frame 22 and the protection tape 29 on the filter mount 25.

Manufacturing the conventional display holding device described above requires that the protection tape 26, 27, 28 and 29 be placed consistently near the outer edges of the screen frame 22, the screen mount 23 and the filter mount 25. The troublesome work increases the manufacturing cost of the conventional PTV.

SUMMARY OF THE INVENTION

It is an object of the present invention to provide a display holding device of a projection display (PTV display holding device) which can effectively protect a filter and a screen from damage due to impact or vibration and which can be manufactured at a lower cost.

According to the present invention, a display holding device of projection television is secured on a cabinet of the projection television and has a rigid material section secured on the cabinet; and an elastic material section for sandwiching the display section, which is integrally formed on the rigid material section. The display section has a screen on which an image is projected and a filter which is provided outside the screen to face the screen at a certain distance. The elastic material section has first to fourth protuberances. The screen is sandwiched between the first and second protuberances on the elastic material section. The filter is sandwiched between the third and fourth protuberances on the elastic material section.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Preferred embodiments of the present invention will be described with reference to attached drawings.

First Embodiment

Figure 1:
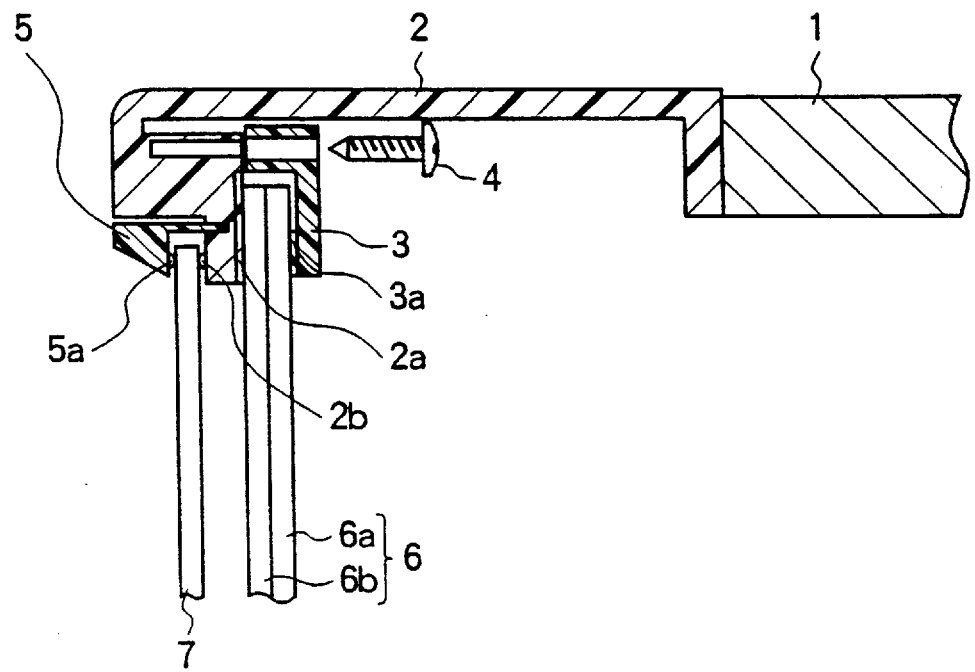
FIG. 1 is a cross section showing the configuration of the PTV display holding device in a first embodiment of the present invention.
Figure 2:
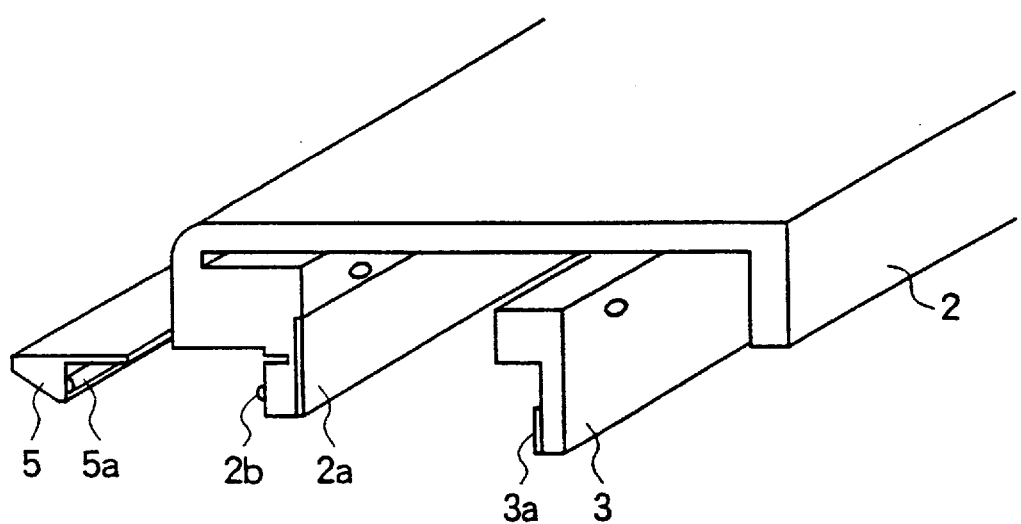
FIG. 2 is an exploded perspective view showing a screen holder, a screen mount and a filter mount of the PTV display holding device shown in FIG. 1.
Figure 3:
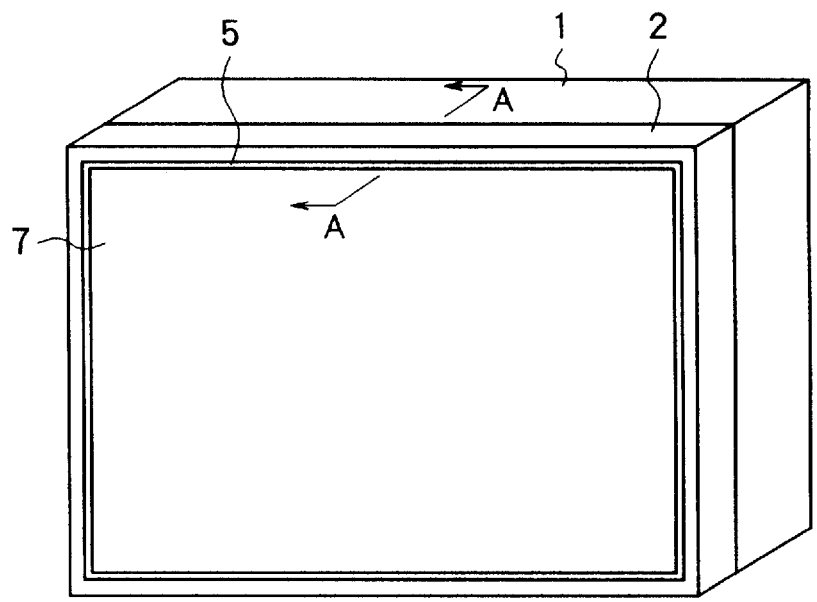
FIG. 3 is a perspective view schematically showing the outward appearance of a PTV incorporating the PTV display holding device shown in FIG. 1.

FIG. 1 and FIG. 2 are a cross section and an exploded perspective view showing a PTV display holding device in the first embodiment of the present invention. FIG. 3 is a perspective view schematically showing the outward appearance of a PTV incorporating the display holding device shown in the first embodiment. FIG. 1 shows the cross-sectional view of the PTV taken along a line A—A of FIG. 3.

As shown in FIG. 1 or FIG. 2, the display holding device in the first embodiment has a screen frame 2 fastened on a PTV cabinet 1 by screws or the like, which are not shown in the figures, a screen mount 3 fastened on the screen frame 2 by screws 4 (multiple screws are used although Just a single screw is shown in FIG. 1), and a filter mount 5 which fits into a depression formed on the outer surface of the screen frame 2 at one end. The screen frame 2, the screen mount 3 and the filter mount 5 are made of a rigid material such as rigid vinyl chloride.

The screen mount 3 has a first protuberance 3a, which is integrally formed on the screen mount 3 but is made of an elastic or flexible material. In the first embodiment, the first protuberance 3a is shaped like a long strip disposed in parallel with the edge of the screen 6, which is about 3.0 [mm] to 7.0 [mm] thick, or disposed perpendicular to the plane containing FIG. 1 (see FIG. 2). The screen frame 2 has second and third protuberances 2a and 2b, which are integrally formed on the screen frame 2 but are made of an elastic material. The second protuberance 2a is shaped like a long strip disposed in parallel with the edge of the screen 6, as shown in FIG. 2. The third protuberance 2b is shaped like a long semicircular cylinder of which longitudinal axis is parallel with the edge of the filter 7, which is about 3.0 [mm] thick. The filter mount 5 has a fourth protuberance 5a, which is integrally formed on the filter mount 5 but is made of an elastic material. The fourth protuberance 5a is shaped like a long semicircular cylinder of which longitudinal axis is parallel with the edge of the filter 7, as shown in FIG. 2. The screen 6 includes a Fresnel lens 6a laid over a lenticular screen 6b.

The first protuberance 3a is made of soft vinyl chloride, for instance, and is simultaneously formed with the screen mount 3 through dual molding. The second and third protuberances 2a and 2b are made of soft vinyl chloride, for instance, and are simultaneously formed with the screen frame 2 through dual molding. The fourth protuberance 5a is made of soft vinyl chloride, for instance, and is simultaneously formed with the filter mount 5 through dual molding. The dual molding is achieved, for example, by extruding or injection-molding a composite material including layers of rigid vinyl chloride and soft vinyl chloride.

FIG. 1 illustrates just the top side of the screen 6 and the filter 7. The screen 6 and the filter 7, however, are tightly sandwiched between the first to fourth protuberances at the bottom side, left side, and right side in the same way. The screen 6 and the filter 7 may be sandwiched between the first to fourth protuberances just at a part near the edges. However, it is preferable to sandwich the screen 6 and the filter 7 between the first to fourth protuberances consistently near the edges.

As has been described above, the display holding device in the first embodiment eliminates the need for the troublesome manufacturing step of adhering protection tape on the screen frame and the like. The manufacturing process is simplified, and the number of necessary components is reduced. Accordingly, the product price can be lowered.

The display holding device in the first embodiment can also hold the screen 6 and filter 7 securely and protect them from damage.

Since the first to fourth protuberances 3a, 2a, 2b and 5a are made of soft vinyl chloride, the effect of the impact and vibration on the filter and screen during transportation is reduced. This prevents the Fresnel lens 6a and lenticular screen 6b from rubbing against each other, consequently preventing a white powdery substance from being produced.

Second Embodiment

Figure 4:
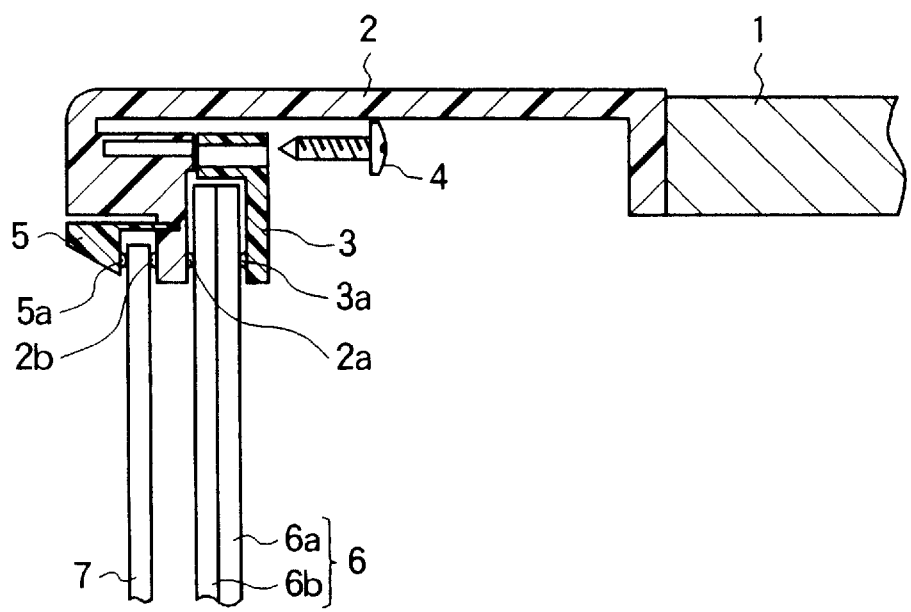
FIG. 4 is a cross section showing the configuration of the PTV display holding device in a second embodiment of the present invention.

FIG. 4 is a cross section schematically showing the display holding device in the second embodiment of the present invention. In FIG. 4, members identical to or corresponding to those shown in FIG. 1 are denoted by the same reference numerals. As shown in FIG. 4, the display holding device in the second embodiment is different from the display holding device in the first embodiment described earlier in that the first and second protuberances 3a and 2a are not shaped like long strips but shaped like long semicircular cylinders of which longitudinal axes are parallel with the edge of the screen 6. The display holding device in the second embodiment has the same effect as the display holding device in the first embodiment described earlier. Except for the difference mentioned above, the display holding device in the second embodiment is the same as the display holding device in the first embodiment described earlier.

Third Embodiment

Figure 5:
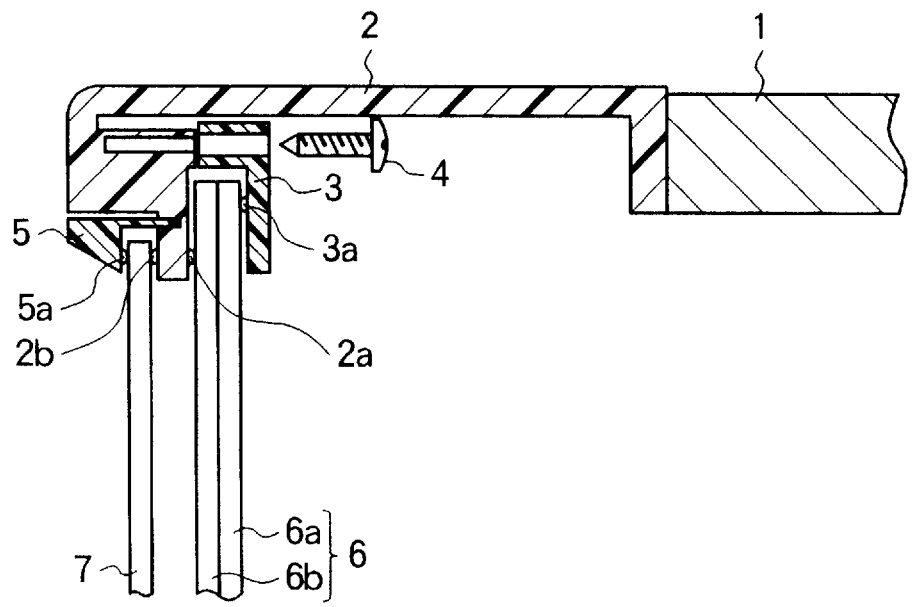
FIG. 5 is a cross section showing the configuration of the PTV display holding device in a third embodiment of the present invention.

FIG. 5 is a cross section schematically showing the display holding device in the third embodiment of the present invention. In FIG. 5, members identical to or corresponding to those shown in FIG. 1 are denoted by the same reference numerals. As shown in FIG. 5, the display holding device in the third embodiment is different from the display holding device in the first embodiment described earlier in the following points. The first and second protuberances 3a and 2a are not shaped like strips but shaped like long semicircular cylinders of which longitudinal axes are parallel with the edge of the screen 6. The first protuberance 3a is in contact with the screen 6 at a position closer to the edge of the screen 6 (at a higher position in FIG. 5) than the second protuberance 2a. The display holding device in the third embodiment has the same effect as the display holding device in the first embodiment described earlier and can also hold the screen 6 so that the screen is slightly curved around its center towards the inside of the PTV. This brings the Fresnel lens 6a and lenticular screen 6b constituting the screen 6 into intimate contact with one another. Except for the differences mentioned above, the display holding device in the third embodiment is the same as the display holding device in the first embodiment described earlier.

Fourth Embodiment

Figure 6:
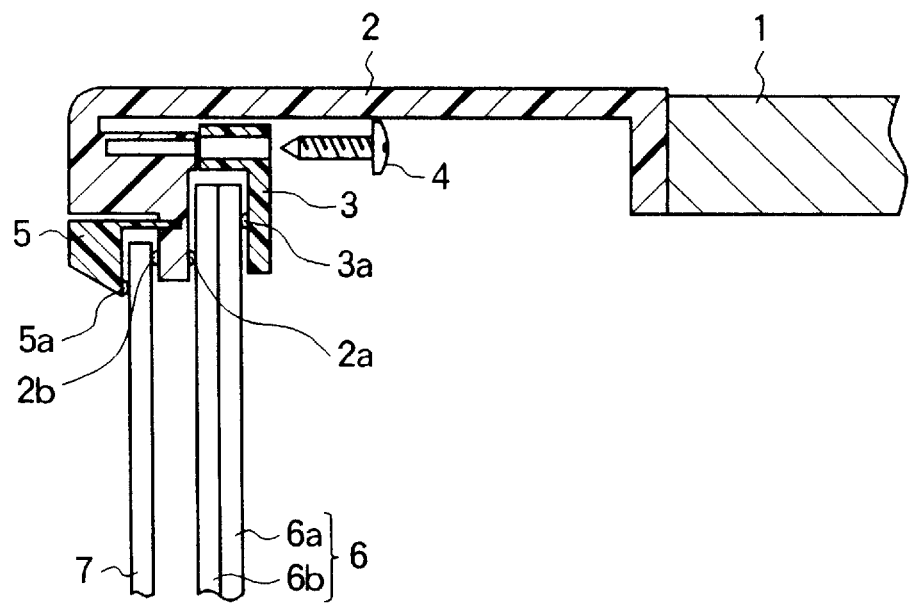
FIG. 6 is a cross section showing the configuration of the PTV display holding device in a fourth embodiment of the present invention.

FIG. 6 is a cross section schematically showing the display holding device in the fourth embodiment of the present invention. In FIG. 6, members identical to or corresponding to those shown in FIG. 1 are denoted by the same reference numerals. As shown in FIG. 6, the display holding device in the fourth embodiment is different from the display holding device in the first embodiment describe earlier in these points. The first and second protuberances 3a and 2a are not shaped like strips but shaped like long semicircular cylinders. The first protuberance 3a is in contact with the screen 6 at a position closer to the edge of the screen 6 (at a higher position in FIG. 6) than the second protuberance 2a. The third protuberance 2b is in contact with the filter 7 at a position closer to the edge of the filter 7 (at a higher position in FIG. 6) than the fourth protuberance 5a. The display holding device in the fourth embodiment has the same effect as the display holding device in the first embodiment described earlier and also holds the screen 6 and filter 7 so that they are slightly curved around their centers towards the inside of the PTV. Except for the differences mentioned above, the display holding device in the fourth embodiment is the same as the display holding device in the first embodiment described earlier.

Fifth Embodiment

Figure 7:
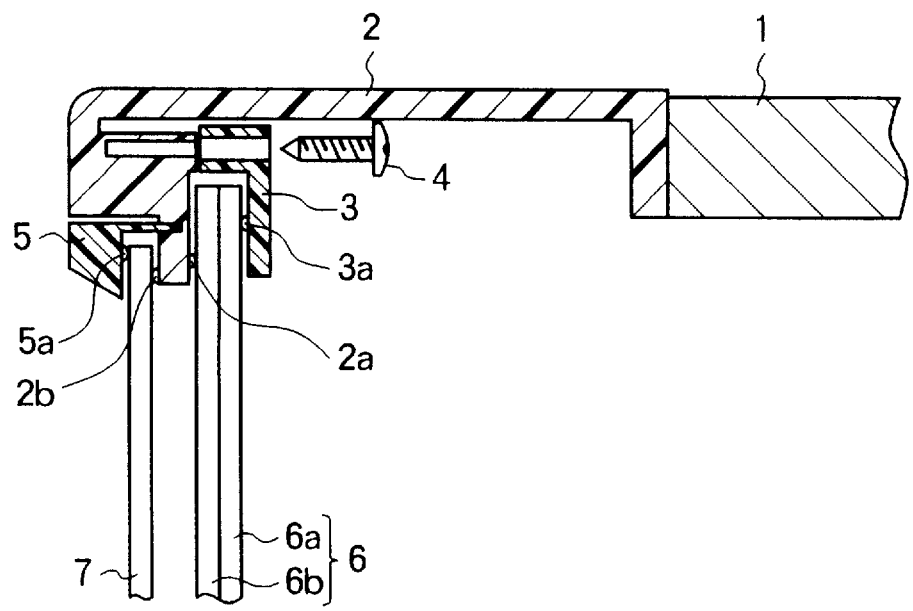
FIG. 7 is a cross section showing the configuration of the PTV display holding device in a fifth embodiment of the present invention.

FIG. 7 is a cross section schematically showing the display holding device in the fifth embodiment of the present invention. In FIG. 7, members identical to or corresponding to those shown in FIG. 1 are denoted by the same reference numerals. As shown in FIG. 7, the display holding device in the fifth embodiment is different from the display holding device in the first embodiment described earlier just in the following points. The first and second protuberance 3a and 2a are not shaped like strips but shaped like long semicircular cylinders. The first protuberance 3a is in contact with the screen 6 at a position closer to the edge of the screen 6

(at a higher position in FIG. 7) than the second protuberance 2a. The fourth protuberance 5a is in contact with the filter 7 at a position closer to the edge of the filter 7 (at a higher position in FIG. 7) than the third protuberance 2b. The display holding device in the fifth embodiment has the same effect as the display holding device in the first embodiment described earlier, and holds the screen 6 and filter 7 so that the screen 6 is slightly curved around its center towards the inside of the PTV and that the filter, is slightly curved around its center towards the outside of the PTV. This prevents the screen 6 and filter 7 from rubbing against each other, consequently preventing a white powdery substance from being produced. Except for the differences mentioned above, the display holding device in the fifth embodiment is the same as the display holding device in the first embodiment described earlier.

Sixth Embodiment

Figure 8:
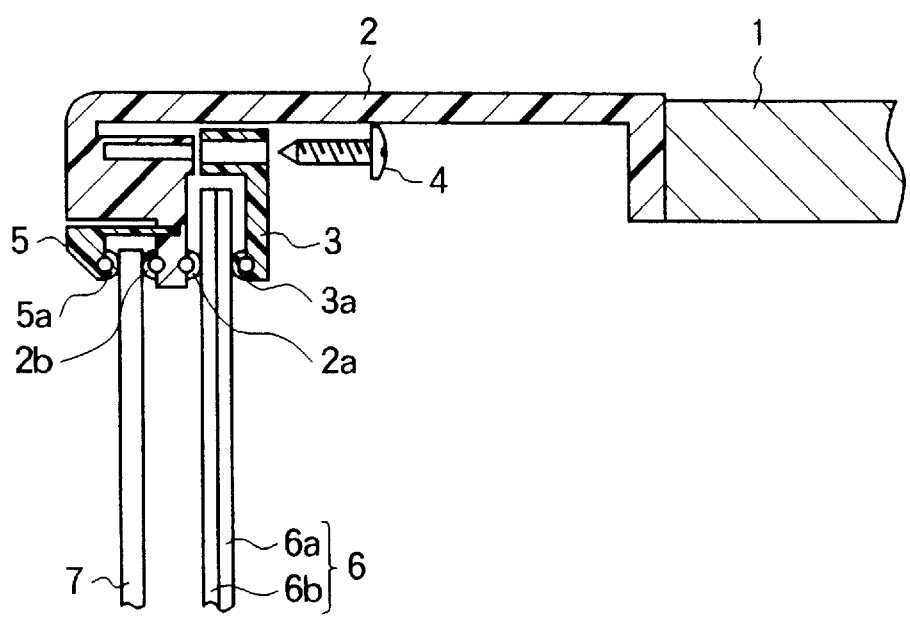
FIG. 8 is a cross section showing the configuration of the PTV display holding device in a sixth embodiment of the present invention.
Figure 9:
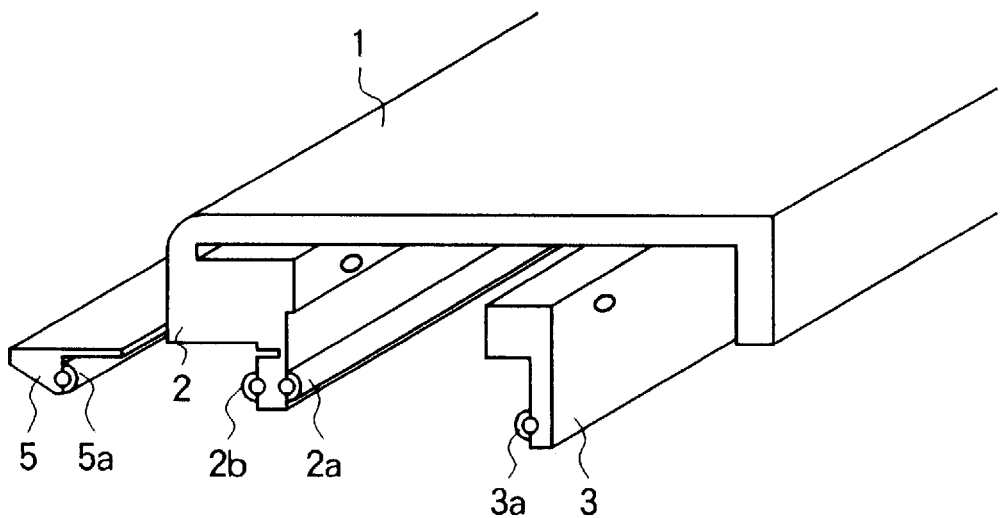
FIG. 9 is an exploded perspective view showing a screen holder, a screen mount and a filter mount of the PTV display holding device shown in FIG. 8.

FIGS. 8 and 9 are a cross section and an exploded perspective view showing the display holding device in the sixth embodiment of the present invention. In FIGS. 8 and 9, members identical to or corresponding to those shown in FIG. 1 are denoted by the same reference numerals. As shown in FIG. 8 or 9, the display holding device in the sixth embodiment is different from the display holding device shown in FIG. 1 in the following points. The first to fourth protuberances 3a, 2a, 2b and 5a are shaped like long hollow semicircular cylinders of which longitudinal axes are parallel with the edge of the screen 6 or filter 7. The first to fourth protuberances 3a, 2a, 2b and 5a are integrally formed on the screen frame 2, screen mount 3, or filter mount 5 in such a manner that the screen frame 2, screen mount 3, or filter mount 5 is joined with the individual protuberances at their two sides parallel to the longitudinal axes. Since the elastic material section is shaped like a hollow semicircular cylinder (with a ring-formed cross section), the display holding device in the sixth embodiment has high elasticity and can securely hold the filter 7 and screen 6 even if the thicknesses of the filter 7 or screen 6 varies. Except for the differences mentioned above, the display holding device in the sixth embodiment is the same as the display holding device in the first embodiment described earlier. As shown in FIGS. 5 to 7, the contact position of the first protuberance 3a may be displaced from the contact position of the second protuberance 2a, and the contact position of the third protuberance 2b may be displaced from the contact position of the fourth protuberance 5a.

Seventh Embodiment

Figure 10:
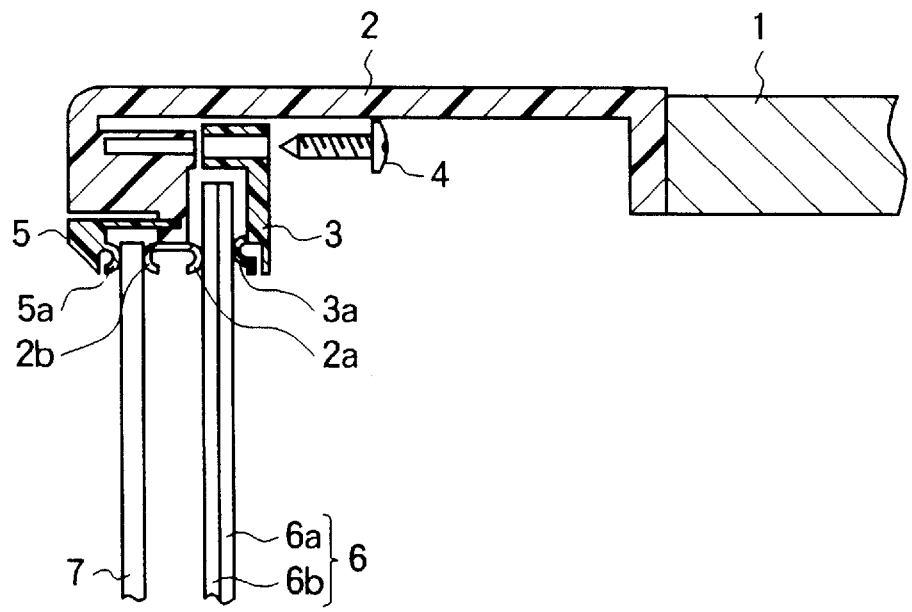
FIG. 10 is a cross section showing the configuration of the PTV display holding device in a seventh embodiment of the present invention.
Figure 11:
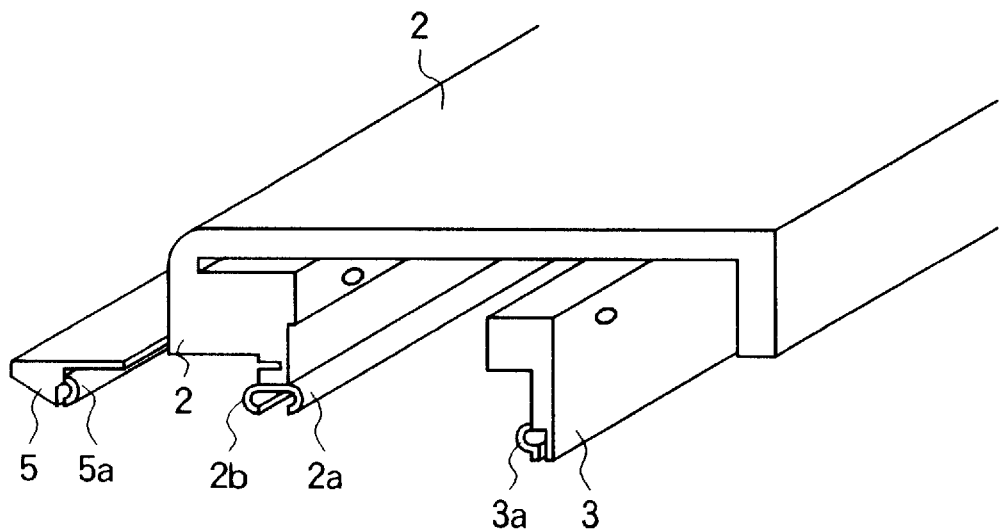
FIG. 11 is an exploded perspective view showing the screen holder, the screen mount and the filter mount of the PTV display holding device shown in FIG. 10.

FIGS. 10 and 11 are a cross section and an exploded perspective view schematically showing the display holding device in the seventh embodiment of the present invention. In FIGS. 10 and 11, members identical to or corresponding to those shown in FIG. 1 are denoted by the same reference numerals. As shown in FIG. 10 or 11, the display holding device in the seventh embodiment is different from the display holding device shown in FIG. 1 in the following points. The first to fourth protuberances 3a, 2a, 2b and 5a are shaped like long hollow semicircular cylinders (with a U-shaped cross section) of which longitudinal axes are parallel with the edge of the screen 6 or filter 7. The first to fourth protuberances 3a, 2a, 2b and 5a are integrally formed on the screen frame 2, screen mount 3, or filter mount 5 in such a manner that the screen frame 2, screen mount 3, or filter mount 5 is joined with the individual protuberances at either of their two sides parallel to the longitudinal axes. Since the elastic material section is shaped like a hollow semicircular cylinder, the display holding device in the seventh embodiment has high elasticity and can securely hold the filter 7 and screen 6 even if the thickness of the filter 7 or screen 6 varies. Except for the differences mentioned above, the display holding device in the seventh embodiment is the same as the display holding device in the first embodiment described earlier. As shown in FIGS. 5 to 7, the contact position of the first protuberance 3a may be displaced from the contact position of the second protuberance 2a, and the contact position of the third protuberance 2b may be displaced from the contact position of the fourth protuberance 5a.

Eighth Embodiment

Figure 12:
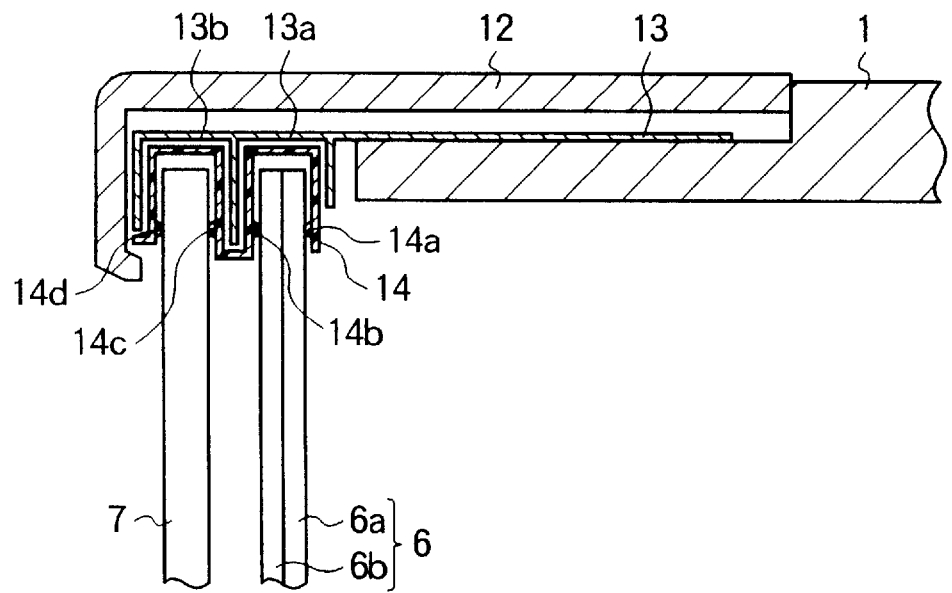
FIG. 12 is a cross section showing the configuration of the PTV display holding device in an eighth embodiment of the present invention.
Figure 13:
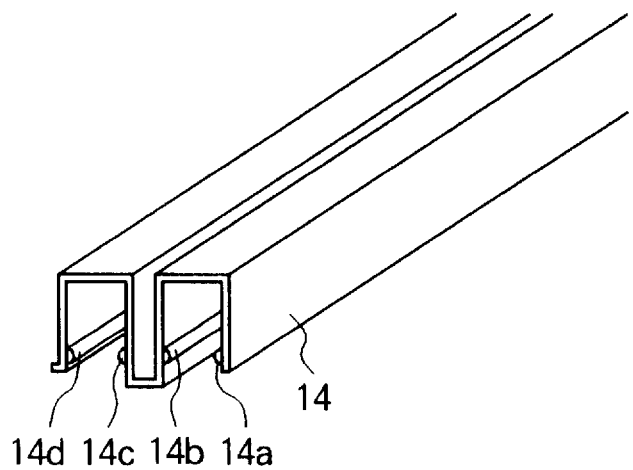
FIG. 13 is a perspective view showing the plate holder of the PTV display holding device shown in FIG. 12.

FIG. 12 is a cross section schematically showing the display holding device in the eighth embodiment of the present invention. FIG. 13 is a perspective view showing a plate holder having first to fourth protuberances.

As shown in FIG. 12, the display holding device in the eighth embodiment includes a screen frame 12 secured on the PTV cabinet 1, a plate mount 13 fastened on the cabinet 1 by screws or the like, which are not shown in the figure, and a plate holder 14 fit into depressions 13a and 13b formed on the plate mount 13. The main body of the plate holder 14 is made of a rigid material such as rigid vinyl chloride.

The plate holder 14 has first to fourth protuberances 14a, 14b, 14c and 14d which are integrally formed on the main body of the plate holder 14 but are made of an elastic or flexible material. In the eighth embodiment, the first to fourth protuberances 14a, 14b, 14c and 14d are shaped like long semicircular cylinders disposed in parallel with the edge of the screen 6, or disposed perpendicular to the plane containing FIG. 1. The first to fourth protuberances 14a, 14b, 14c and 14d are made of soft vinyl chloride, for instance, and are integrally formed on the plate holder 14 through dual molding.

FIGS. 12 and 13 illustrate Just the top side of the screen 6 and filter 7. The screen 6 and filter 7, however, are tightly sandwiched between the first to fourth protuberances 14a, 14b, 14c and 14d at the bottom side, left side, and right side in the same way.

As has been described above, the display holding device in the eighth embodiment eliminates the need for the manufacturing step of adhering protection tape, enabling the manufacturing cost to be reduced.

The display holding device in the eighth embodiment can also hold the screen 6 and filter 7 securely and protect them from damage.

Since the first to fourth protuberances 14a, 14b, 14c and 14d are made of soft vinyl chloride, the effect of impact and vibration on the filter and screen during transportation is reduced. This prevents the Fresnel lens 6a and lenticular screen 6b from rubbing against each other, consequently preventing a white powdery substance from being produced.

Since just the plate holder 14 is a separate part, the manufacturing process is much simpler than the manufacturing process in the first embodiment, which uses three separate parts.

Except for the differences mentioned above, the display holding device in the eighth embodiment is the same as the display holding device in the first embodiment described earlier.

Ninth Embodiment

Figure 14:
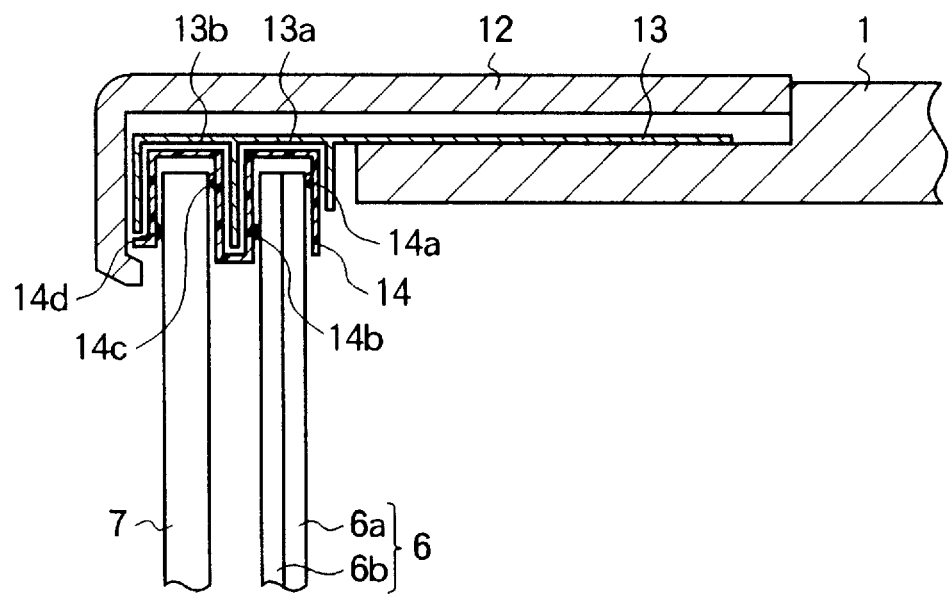
FIG. 14 is a cross section showing the configuration of the PTV display holding device in a ninth embodiment of the present invention.
Figure 15:
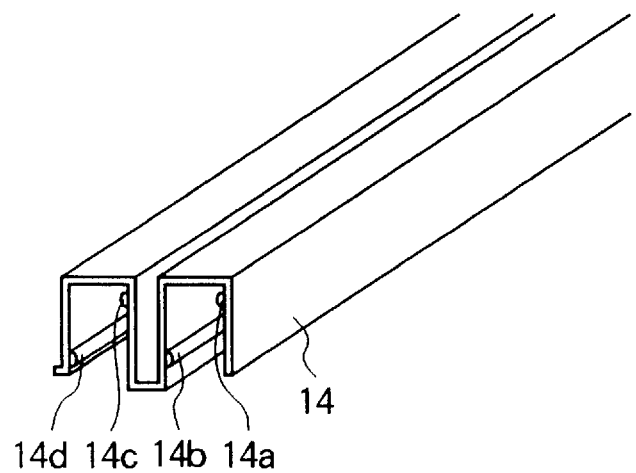
FIG. 15 is a perspective view showing a plate holder of the PTV display holding device shown in FIG. 14.

FIG. 14 is a cross section schematically showing the display holding device in the ninth embodiment of the present invention. FIG. 15 is a perspective view showing a plate holder having first to fourth protuberances. In FIGS. 14 and 15, members identical to or corresponding to those shown in FIGS. 12 and 13 are denoted by the same reference numerals. As shown in FIG. 14 or 15, the display holding device in the ninth embodiment is different from the display holding device in the eighth embodiment described earlier in the following points. The first protuberance 14*a* is in contact with the screen 6 at a position closer to the edge of the screen 6 (at a higher position in FIG. 14) than the second protuberance 14*b*. The third protuberance 14*c* is in contact with the filter 7 at a position closer to the edge of the filter 7 (at a higher position in FIG. 14) than the fourth protuberance 14*d*. The display holding device in the ninth embodiment has the same effect as the display holding device in the eighth embodiment described earlier and also holds the screen 6 and filter 7 so that they are slightly curved around their centers towards the inside of the PTV. Except for the differences mentioned above, the display holding device in the ninth embodiment is the same as the display holding device in the eighth embodiment described earlier.

Tenth Embodiment

Figure 16:
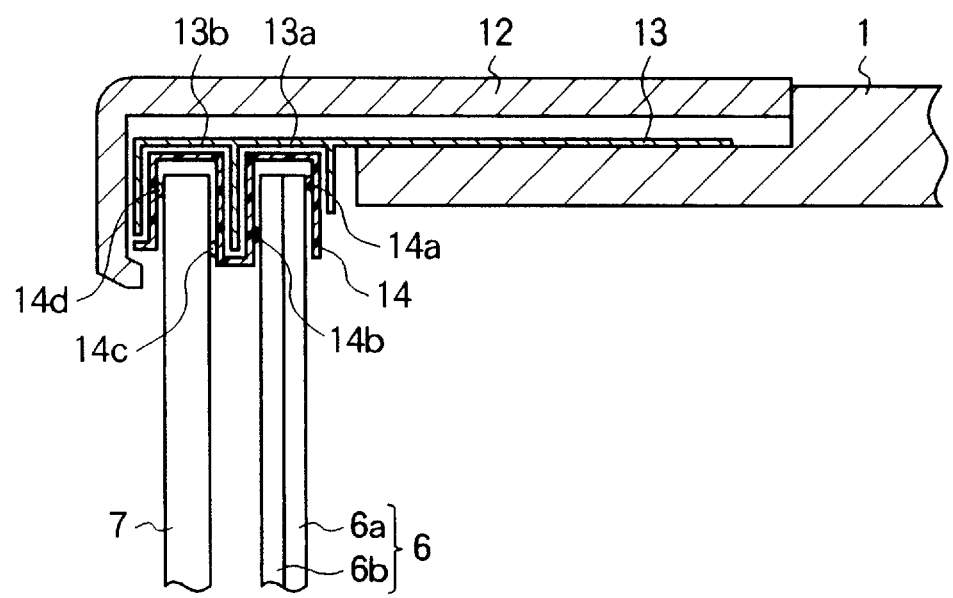
FIG. 16 is a cross section showing the configuration of the PTV display holding device in a tenth embodiment of the present invention.

FIG. 16 is a cross section schematically showing the display holding device in the tenth embodiment of the present invention. In FIG. 16, members identical to or corresponding to those shown in FIGS. 12 and 13 are denoted by the same reference numerals. As shown in FIG. 16, the display holding device in the tenth embodiment is different from the display holding device in the eighth embodiment described earlier in the following points. The first protuberance 14*a* is in contact with the screen 6 at a position closer to the edge of the screen 6 (at a higher the second pro in FIG. 16) than the second protuberance 14*b*. The fourth protuberance 14*d* is in contact with the filter 7 at a position closer to the edge of the filter 7 (at a higher position in FIG. 16) than the third protuberance 14*c*. The display holding device in the tenth embodiment has the same effect as the display holding device in the eighth embodiment described earlier and also holds the screen 6 and filter 7 so that the screen is slightly curved around its center towards the inside of the PTV and that the filter is slightly curved around its center towards the outside of the PTV. This prevents the screen 6 and filter 7 from rubbing against each other, consequently preventing a white powdery substance from being produced. Except for the differences mentioned above, the display holding device in the tenth embodiment is the same as the display holding device in the eighth embodiment described earlier.

Eleventh Embodiment

Figure 17:
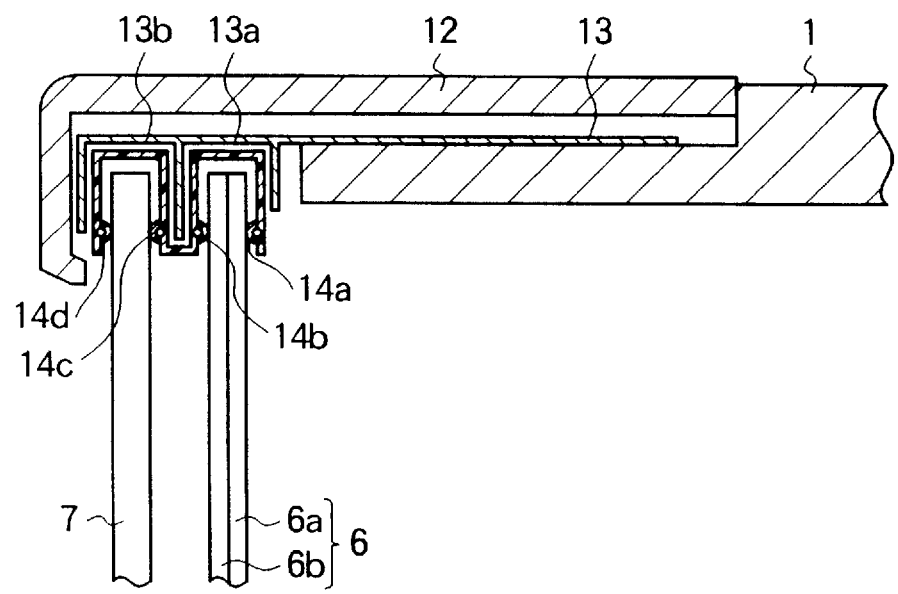
FIG. 17 is a cross section showing the configuration of the PTV display holding device in an eleventh embodiment of the present invention.
Figure 18:
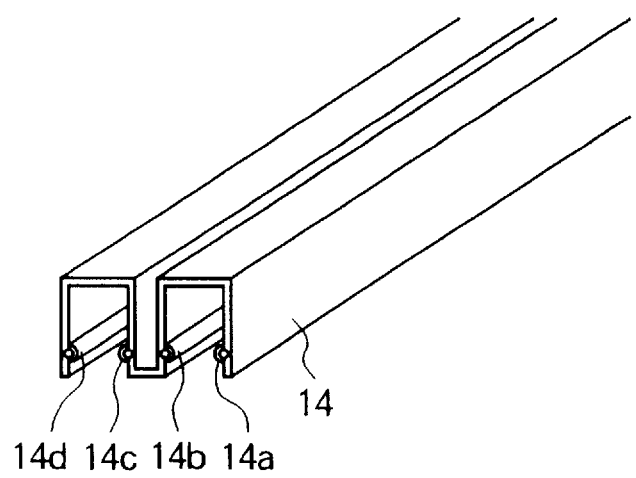
FIG. 18 is a perspective view showing a plate holder of a the PTV display holding device shown in FIG. 17.
Figure 19:
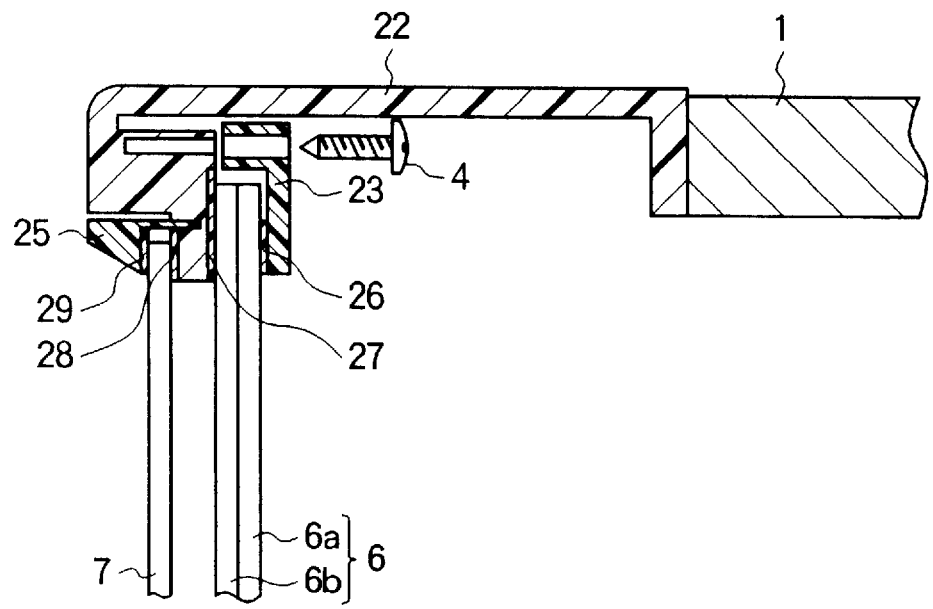
FIG. 19 is a cross section showing the configuration of a conventional PTV display holding device.

FIG. 17 is a cross section schematically showing the display holding device in the eleventh embodiment of the present invention. FIG. 18 is a perspective view showing a plate holder having first to fourth protuberances. In FIGS. 17 and 18, members identical to or corresponding to those shown in FIGS. 12 and 13 are denoted by the same reference numerals. As shown in FIG. 17 or 18, the display holding device in the eleventh embodiment is different from the display holding device in the eighth embodiment described earlier in the following point. The first to fourth protuberances 14*a*, 14*b*, 14*c* and 14*d* are shaped like hollow semicircular cylinders, as in FIG. 8. Since the elastic material section is shaped like a hollow semicircular cylinder, the display holding device in the eleventh embodiment has high elasticity and can securely hold the filter 7 and screen 6 even if the thicknesses of the filter 7 or screen 6 varies. As shown in FIGS. 14 to 16, the contact position of the first protuberance 14*a* may be displaced from the contact position of the second protuberance 14*b*, and the contact position of the third protuberance 14*c* may be displaced from the contact position of the fourth protuberance 14*d*. Except for the differences mentioned above, the display holding device in the eleventh embodiment is the same as the display holding device in the eighth embodiment described earlier.

What is claimed is:

1. A display holding device secured on a cabinet of a projection television adapted to hold a display section of the projection television, said display holding device comprising:

a rigid material section secured on the cabinet; and an elastic material section for sandwiching the display section, said elastic material section being integrally formed on said rigid material section wherein said elastic material section includes a first protuberance and a second protuberance adapted to contact an inner surface and an outer surface of a screen of the display section, respectively, and a third protuberance and a fourth protuberance adapted to contact an inner surface and outer surface of a filter of the display section, respectively;

only said first protuberance and said second protuberance of said elastic material being adapted to sandwich the screen therebetween, and said third protuberance and said fourth protuberance of said elastic material section being adapted to sandwich the filter therebetween; and said first protuberance when in contact with the screen being positioned only in a place which is nearer to the edge of the screen than a place where said second protuberance is positioned, said second protuberance when in contact with the screen being positioned only in a place which is farther from the edge of the screen than a place where said first protuberance is positioned.

2. The display holding device claim 1, wherein said rigid material section includes:

a screen frame, secured on said cabinet and provided with said second protuberance and said third protuberance;

a screen mount, secured on said screen frame and provided with said first protuberance; and a filter mount, secured on said screen frame and provided with said fourth protuberance.

3. The display holding device of claim 1, wherein a contact position of said third protuberance on the filter is closer to an edge of the filter than a contact position of said fourth protuberance on the filter when the device is in contact with the displayed section.

4. The display holding device of claim 1, wherein a contact position of said fourth protuberance on the filter is closer to an edge of the filter than a contact position of said third protuberance on the filter when the device is in contact with the display section.

5. The display holding device of claim 1, wherein said first to fourth protuberances are shaped like hollow semicircular cylinders; and said rigid material section is joined with said first to fourth protuberances at their two sides.

6. The display holding device of claim 1, wherein said first to fourth protuberances are shaped like hollow semicircular cylinders; and said rigid material section is joined with said first to fourth protuberances at one of their sides.

7. The display holding device of claim 1, wherein said rigid material section is made of rigid vinyl chloride; and said elastic material section is made of soft vinyl chloride.

8. A display holding device secured on a cabinet of a projection television adapted to hold a display section of the projection television, said display holding device comprising:

a rigid material section secured on the cabinet; and an elastic material section for sandwiching said display section, said elastic material section being integrally formed on said rigid material section;

said elastic material section including a first protuberance and a second protuberance on said elastic material section being adapted to sandwich a screen of the display section therebetween and a third protuberance and a fourth protuberance on said elastic material section being adapted to sandwich a filter of the display section therebetween;

wherein said rigid material section includes
    a plate mount, secured on the cabinet; and
    a plate holder which fits in a depression of said plate mount and has said first to fourth protuberances.

9. The display holding device of claim 8, wherein a contact position of said first protuberance on the screen is closer to an edge of the screen than a contact position of said second protuberance on the screen when the device is in contact with the display section.

10. The display holding device of claim 8, wherein a contact position of said third protuberance on the filter is closer to an edge of the filter than a contact position of said fourth protuberance on the filter when the device is in contact with the display section.

11. The display holding device of claim 8, wherein a contact position of said fourth protuberance on the filter is closer to an edge of the filter than a contact position of said third protuberance on the filter when the device is contact with the display section.

12. The display holding device of claim 8, wherein said first to fourth protuberances are shaped like hollow semicircular cylinders; and said rigid material section is joined with said first to fourth protuberances at their two sides.

13. The display holding device of claim 8, wherein said rigid material section is made of rigid vinyl chloride; and said elastic material section is made of soft vinyl chloride.

\* \* \* \* \*